United States Patent
Beheshti-Zavareh et al.

(10) Patent No.: US 9,319,324 B2
(45) Date of Patent: Apr. 19, 2016

(54) METHOD AND SYSTEM OF SERVICE PLACEMENT FOR SERVICE CHAINING

(71) Applicant: Telefonaktiebolaget L M Ericsson (publ), Stockholm (SE)

(72) Inventors: Neda Beheshti-Zavareh, San Jose, CA (US); Ying Zhang, Fremont, CA (US)

(73) Assignee: TELEFONAKTIEBOLAGET L M ERICSSON (PUBL), Stockholm (SE)

( * ) Notice: Subject to any disclaimer, the term of this patent is extended or adjusted under 35 U.S.C. 154(b) by 142 days.

(21) Appl. No.: 14/099,401

(22) Filed: Dec. 6, 2013

(65) Prior Publication Data

US 2015/0163150 A1 Jun. 11, 2015

(51) Int. Cl.
*H04L 12/851* (2013.01)
*H04L 12/727* (2013.01)
*H04L 12/751* (2013.01)
*H04L 12/733* (2013.01)

(52) U.S. Cl.
CPC ............ *H04L 47/2408* (2013.01); *H04L 45/02* (2013.01); *H04L 45/121* (2013.01); *H04L 45/20* (2013.01)

(58) Field of Classification Search
CPC ... H04L 47/2408; H04L 45/121; H04L 45/64; H04L 41/5054
See application file for complete search history.

(56) References Cited

U.S. PATENT DOCUMENTS

| | | | |
|---|---|---|---|
| 7,298,725 B2 | 11/2007 | Rune | |
| 7,733,913 B1 | 6/2010 | Cheung et al. | |
| 7,860,100 B2 | 12/2010 | Khalid et al. | |
| 8,170,038 B2 | 5/2012 | Belanger et al. | |
| 8,284,664 B1 | 10/2012 | Aybay et al. | |
| 8,583,781 B2 | 11/2013 | Raleigh | |
| 2006/0084432 A1 | 4/2006 | Balasubramanian et al. | |
| 2009/0164583 A1 | 6/2009 | Zhu | |
| 2009/0259810 A1 | 10/2009 | Baden et al. | |
| 2010/0148910 A1 | 6/2010 | Takada | |

(Continued)

FOREIGN PATENT DOCUMENTS

| | | |
|---|---|---|
| EP | 1387553 A1 | 2/2004 |
| EP | 2226970 A1 | 9/2010 |
| WO | 2012/047885 A1 | 4/2012 |

OTHER PUBLICATIONS

"OpenFlow Switch Specification; Version 1.1.0 Implemented (Wire Protocol 0x02)"; Feb. 28, 2011; 56 pages.

(Continued)

*Primary Examiner* — Mohammad Anwar
(74) *Attorney, Agent, or Firm* — Nicholson De Vos Webster & Elliott LLP

(57) ABSTRACT

A method for placing services at network devices is disclosed. A network contains a plurality of network devices and the network offers a set of services to subscribers. Each subscriber of the network utilizes a subset of the set of service, where an order of the services is not predefined. The method starts with ordering the services from the most utilized service to the least utilized, and selects services from the most utilized to the least utilized. For each service, a network device is selected so that placing the service adds a least sum of additional delay based on services already placed in the network, and a path for each subscriber utilizing the service is updated to include the service, where the path is an ordered chain of services, and where the service is inserted in the path to result in minimum addition to delay to the subscriber.

20 Claims, 10 Drawing Sheets

(56) References Cited

U.S. PATENT DOCUMENTS

| | | | |
|---|---|---|---|
| 2010/0303083 | A1 | 12/2010 | Belanger et al. |
| 2011/0055845 | A1 | 3/2011 | Nandagopal et al. |
| 2012/0163180 | A1 | 6/2012 | Goel |
| 2012/0281540 | A1 | 11/2012 | Khan et al. |
| 2013/0290955 | A1 | 10/2013 | Turner et al. |
| 2014/0149493 | A1 | 5/2014 | Acer et al. |
| 2015/0106526 | A1* | 4/2015 | Arndt ............................ 709/227 |

OTHER PUBLICATIONS

"OpenFlow: Enabling Innovation in Campus Networks"; Nick Mckeown, et al., openflowswitch.org, Mar. 14, 2008; 6 pages.

Dilip, A. J., "A Policy-aware Switching Layer for Data Centers", Sigcomm '08, Aug. 17-22, 2008, pp. 51-62.

Montreal, Geoffrey L., et al., "Chaining of Inline Services Using Software Defined Networking", U.S. Appl. No. 13/556,456, filed Jul. 24, 2012, 43 pages.

Zhang, Ying, et al., "Method and Apparatus for Placing Services in a Network", U.S. Appl. No. 13/751,826, filed Jan. 28, 2013, 28 pages.

Zhang, Ying, et al., "A Method and System of Bandwidth-aware Service Placement for Service Chaining", U.S. Appl. No. 13/904,539, filed May 29, 2013, 32 pages.

International Search Report and Written Opinion for International Application No. PCT/IB2014/065799, mailed Feb. 2, 2015, 14 pages.

Li, Erran et al., "Mosaic: Policy Homomorphic Network Extension", Lux Et Veritas, Yale University Department of Computer Science, May 13, 2010, 15 pages.

Zhang et al., "StEERING: A Software-Defined Networking for Inline Service Chaining", 2013 21st IEEE International Conference on Network Protocols (ICNP), IEEE, Oct. 7, 2013, pp. 1-10.

Openflow 1.1 in Hardware: "I was wrong (again)", Apr. 29, 2011, 3 pages.

"A 100 Gig Openflow 1.1 Switch", Powerpoint slide downloaded from the Internet on Apr. 16, 2013, 1 page.

International Search Report and Written Opinion for PCT/IB2013/053017, mailed Sep. 30, 2013, 10 pages.

Guo et al., "Composition Oriented Web Service Semantic Relations Research", IEEE Computer Society, 2011 International Joint Conference on Service Sciences, May 28, 2011, pp. 69-73.

Lee et al., "A Context-aware Service Composition Scheme for Service Overlay Network", ICT Convergence (ICTC), 2011 International Conference on, IEEE, Sep. 28, 2011, 6 pages.

J. Postel, "User Datagram Protocol," Aug. 28, 1980, 3 pages, RFC: 768.

"Transmission Control Protocol, DARPA Internet Program Protocol Specification," Sep. 1981, 91 pages, RFC: 793, Information Sciences Institute, University of Southern California, Marina del Rey, California.

C. Hedrick, "Routing Information Protocol," Jun. 1988, 33 pages, Network Working Group, Request for Comments: 1058.

David Oran, "OSI IS-IS Intra-domain Routing Protocol," Feb. 1990, 157 pages, Network Working Group, Request for Comments: 1142.

T. Socolofsky, et al., "A TCP/IPp Tutorial," Jan. 1991, 28 pages, Network Working Group, Request for Comments: 1180.

G. Malkin, et al., "RIPng for IPv6," Jan. 1997, 19 pages, Network Working Group, Request for Comments: 2080.

R. Braden, et al., "Resource ReSerVation Protocol (RSVP)—Version 1 Functional Specification," Sep. 1997, 112 pages, Network Working Group, Request for Comments: 2205.

J. Wroclawski, "The Use of RSVP with IETF Integrated Services," Sep. 1997, 33 pages, Network Working Group, Request for Comments: 2210.

J. Wroclawski, "Specification of the Controlled-Load Network Element Service," Sep. 1997, 19 pages, Network Working Group, Request for Comments: 2211.

S. Shenker, et al., "Specification of Guaranteed Quality of Service," Sep. 1997, 20 pages, Network Working Group, Request for Comments: 2212.

J. Moy, "OSPF Version 2," Apr. 1998, 244 pages, Network Working Group, Request for Comments: 2328, The Internet Society.

G. Malkin, "RIP Version 2," Nov. 1998, 39 pages, Network Working Group, Request for Comments: 2453, The Internet Society.

S. Deering, et al., "Internet Protocol, Version 6 (IPv6) Specification," Dec. 1998, 39 pages, Network Working Group, Request for Comments: 2460, The Internet Society.

K. Nichols, et al., "Definition of the Differentiated Services Field (DS Field) in the IPv4 and IPv6 Headers," Dec. 1998, 20 pages, Network Working Group, Request for Comments: 2474, The Internet Society.

S. Blake, et al., "An Architecture for Differentiated Services," Dec. 1998, 36 pages, Network Working Group, Request for Comments: 2475, The Internet Society.

J. Heinanen, et al., "Assured Forwarding PHB Group," Jun. 1999, 11 pages, Network Working Group, Request for Comments: 2597, The Internet Society.

D. Borman, et al., "IPv6 Jumbograms," Aug. 1999, 9 pages, Network Working Group, Request for Comments: 2675, The Internet Society.

D. Black, "Differentiated Services and Tunnels," Oct. 2000, 14 pages, Network Working Group, Request for Comments: 2983, The Internet Society.

K. Nichols, et al., "Definition of Differentiated Services Per Domain Behaviors and Rules for their Specification," Apr. 2001, 24 pages, Network Working Group, Request for Comments: 3086, The Internet Society.

D. Black, et al., "Per Hop Behavior Identification Codes," Jun. 2001, 8 pages, Network Working Group, Request for Comments: 3140, The Internet Society.

D. Awduche, et al., "RSVP-TE: Extensions to RSVP for LSP Tunnels," Dec. 2001, 61 pages, Network Working Group, Request for Comments: 3209, The Internet Society.

B. Davie, et al., "An Expedited Forwarding PHB (Per-Hop Behavior)," Mar. 2002, 16 pages, Network Working Group, Request for Comments: 3246, The Internet Society.

A. Charny, et al., "Supplemental Information for the New Definition of the EF PHB (Expedited Forwarding Per-Hop Behavior)," Mar. 2002, 24 pages, Network Working Group, Request for Comments: 3247, The Internet Society.

D. Grossman, "New Terminology and Clarifications for Diffserv," Apr. 2002, 10 pages, Network Working Group, Request for Comments: 3260, The Internet Society.

F. Baker, et al., "Management Information Base for the Differentiated Services Architecture," May 2002, 116 pages, Network Working Group, Request for Comments: 3289, The Internet Society.

Y. Bernet, et al., "An Informal Management Model for Diffserv Routers," May 2002, 56 pages, Network Working Group, Request for Comments: 3290, The Internet Society.

K. Chan, et al. "Differentiated Services Quality of Service Policy Information Base," Mar. 2003, 96 pages, Network Working Group, Request for Comments: 3317, The Internet Society.

L. Berger, "Generalized Multi-Protocol Label Switching (GMPLS) Signaling Resource ReserVation Protocol-Traffic Engineering (RSVP-TE) Extensions," Jan. 2003, 42 pages, Network Working Group, Request for Comments: 3473, The Internet Society.

K. Kompella, et al., "Procedures for Modifying the Resource reSerVation Protocol (RSVP)," Oct. 2004, 7 pages, Network Working Group, Request for Comments: 3936, The Internet Society.

B. Fenner, et al., "Management Information Base for the User Datagram Protocol (UDP)," Jun. 2005, 19 pages, Network Working Group, Request for Comments: 4113, The Internet Society.

Y. Rekhter, et al., "A Border Gateway Protocol 4 (BGP-4)," Jan. 2006, 104 pages, Network Working Group, Request for Comments: 4271, The Internet Society.

S. Kent, et al., "Security Architecture for the Internet Protocol," Dec. 2005, 101 pages, Network Working Group, Request for Comments: 4301, The Internet Society.

R. Housley, et al., "Using Advanced Encryption Standard (AES) CCM Mode with IPsec Encapsulating Security Payload (ESP)," Dec. 2005, 13 pages, Network Working Group, Request for Comments: 4309, The Internet Society.

J. Polk, et al., "A Resource Reservation Protocol (RSVP) Extension for the Reduction of Bandwidth of a Reservation Flow," May 2006, 21 pages, Network Working Group, Request for Comments: 4495, The Internet Society.

(56) References Cited

OTHER PUBLICATIONS

Z. Ali, et al., "Node-ID Based Resource Reservation Protocol (RSVP) Hello: A Clarification Statement," Jun. 2006, 7 pages, Network Working Group, Request for Comments: 4558, The Internet Society.

J. Babiarz, et al., "Configuration Guidelines for DiffServ Service Classes," Aug. 2006, 57 pages, Network Working Group, Request for Comments: 4594, The Internet Society.

L. Andersson, et al., "LDP Specification," Oct. 2007, 135 pages, Network Working Group, Request for Comments: 5036, The IETF Trust.

R. Coltun, et al., "OSPF for IPv6," Jul. 2008, 94 pages, Network Working Group, Request for Comments: 5340, The IETF Trust.

L. Eggert, et al., "Unicast UDP Usage Guidelines for Application Designers," Nov. 2008, 27 pages, Network Working Group, Request for Comments: 5405, IETF Trust and the persons identified as the document authors.

F. Baker, et al., "A Differentiated Services Code Point (DSCP) for Capacity-Admitted Traffic," May 2010, 14 pages, Internet Engineering Task Force (IETF), Request for Comments: 5865, IETF Trust and the persons identified as the document authors.

\* cited by examiner

METHOD AND SYSTEM OF SERVICE PLACEMENT FOR SERVICE CHAINING

CROSS-REFERENCE TO RELATED APPLICATIONS

This application is related to co-pending U.S. patent application Ser. No. 13/556,456, entitled "Chaining of Inline Services Using Software Defined Networking," filed on Jul. 24, 2012, co-pending U.S. patent application Ser. No. 13/751,826, entitled "Method and Apparatus for Placing Services in a Network," filed on Jan. 28, 2013, co-pending U.S. patent application Ser. No. 13/904,539, entitled "A Method and System of Bandwidth-aware Service Placement for Service Chaining", filed on May 29, 2013, which are incorporated by reference herein in their entirety.

FIELD OF INVENTION

The embodiments of the invention are related to the field of networking. More specifically, the embodiments of the invention relate to a method and system of service placement for service chaining in a network.

BACKGROUND

Operators use different middlebox services or appliances, called inline services, such as deep packet inspection (DPI), logging/metering/charging/advanced charging, firewall (FW), virus scanning (VS), intrusion detection and prevention (IDP), network address translation (NAT), etc., to manage subscribers' traffic. These services have high requirements on throughput and packet inspection capabilities. They can be transparent or nontransparent to the end users. Inline services can be hosted in dedicated physical hardware, or in virtual machines.

Service chaining is required if the traffic needs to go through more than one inline service. Moreover, if more than one chain of services is possible, then the operator needs to configure the networking infrastructure to direct the right traffic through the right inline service path. In this specification, traffic steering refers to leading the traffic through the right inline service path.

There have been some efforts to determine how to steer traffic to provide inline service chaining. The mechanisms developed through those efforts generally are designed to explicitly insert the inline services on the path between endpoints, or explicitly route traffic through different middleboxes according to policies. These mechanisms only provide suboptimal performance within a network in connecting services to the network. While the prior co-pending patent applications cited above aim at routing in a network where the order of services is predetermined, and embodiments of this invention aim at determining optimal locations for placing services where the subscribers do not have to be served by services with a predetermined order.

SUMMARY

A method implemented in a network for placing services at network devices is disclosed. The network contains a plurality of network devices and the network offers a set of services to subscribers. Each subscriber of the network utilizes a subset of the set of service and the subset of the set of services is included in a chain of services for each subscriber, where an order of entries within the chain of services is not predefined, and where traversing the plurality of network devices causes delay to the subscribers. The method associates a service with one of the plurality of network devices of the network when a group of one or more services have not been placed, the method starts with ordering the group of one or more services from a most utilized service to a least utilized service, and selects services from the most utilized service to the least utilized service. For each service, a network device for the service is selected so that placing the service to the network adds a least sum of additional delay based on services already placed in the network, and a path for each subscriber utilizing the service is updated to include the service, where the path is an ordered chain of services included in the subset of the set of service the subscriber utilizing, and where the service is inserted in the path to result in minimum addition to delay to the subscriber.

A network device for placing services at network devices is disclosed. The network contains a plurality of network devices and the network offers a set of services to subscribers. Each subscriber of the network utilizes a subset of the set of service and the subset of the set of services is included in a chain of services for each subscriber, where an order of entries within the chain of services is not predefined, and where traversing the plurality of network devices causes delay to the subscribers. The network device contains a service allocation processor for allocating services to the plurality of network devices, the service allocation processor includes a service selector configured to order the group of one or more services from a most utilized service to a least utilized service. The service selector is further configured to select services from the most utilized service to the least utilized service. For each service, a service placing logic of the service allocation processor is configured to select a network device of the network for the service so that placing the service to the network adds a least sum of additional delay based on services already placed in the network. In addition, a path planner of the service allocation processor is configured to update a path for each subscriber utilizing the service to include the service, where the path is an ordered chain of services included in the subset of the set of services the subscriber utilizing, and where the service is inserted in the path to result in minimum addition to delay to the subscriber.

A non-transitory machine-readable storage medium having instructions stored therein for placing services at network device is disclosed. The non-transitory machine-readable storage medium, when executed by a processor, causes the processor to perform operations implemented at a network device of a network. The network contains a plurality of network devices, where the network offers a set of services to subscribers. Each subscriber of the network utilizes a subset of the set of services, where the subset of the set of services is included in a chain of services for each subscriber, where an order of entries within the chain of services is not predefined. Traversing the plurality of network devices causes delay to the subscribers, and the operations associate a service with one of the plurality of network devices of the network when a group of one or more services have not been placed. The operations comprising start with ordering the group of one or more services from a most utilized service to a least utilized service, and select services from the most utilized service to the least utilized service. For each service, a network device for the service is selected so that placing the service to the network adds a least sum of additional delay based on services already placed in the network, and a path for each subscriber utilizing the service is updated to include the service, where the path is an ordered chain of services included in the subset of the set of service the subscriber utilizing, and where the service is inserted in the path to result in minimum addition to delay to the subscriber Embodiments of the invention utilizes algorithms to select optimal locations for placing services to minimize overall latency for subscribers, where the subscribers do not have to be served by services with a predetermined order.

BRIEF DESCRIPTION OF THE DRAWINGS

The present invention is illustrated by way of example, and not by way of limitation, in the figures of the accompanying drawings in which like references indicate similar elements. It should be noted that different references to "an" or "one" embodiment in this specification are not necessarily to the same embodiment, and such references mean at least one. Further, when a particular feature, structure, or characteristic is described in connection with an embodiment, it is submitted that it is within the knowledge of one skilled in the art to affect such feature, structure, or characteristic in connection with other embodiments whether or not explicitly described.

DETAILED DESCRIPTION

Figure 1:
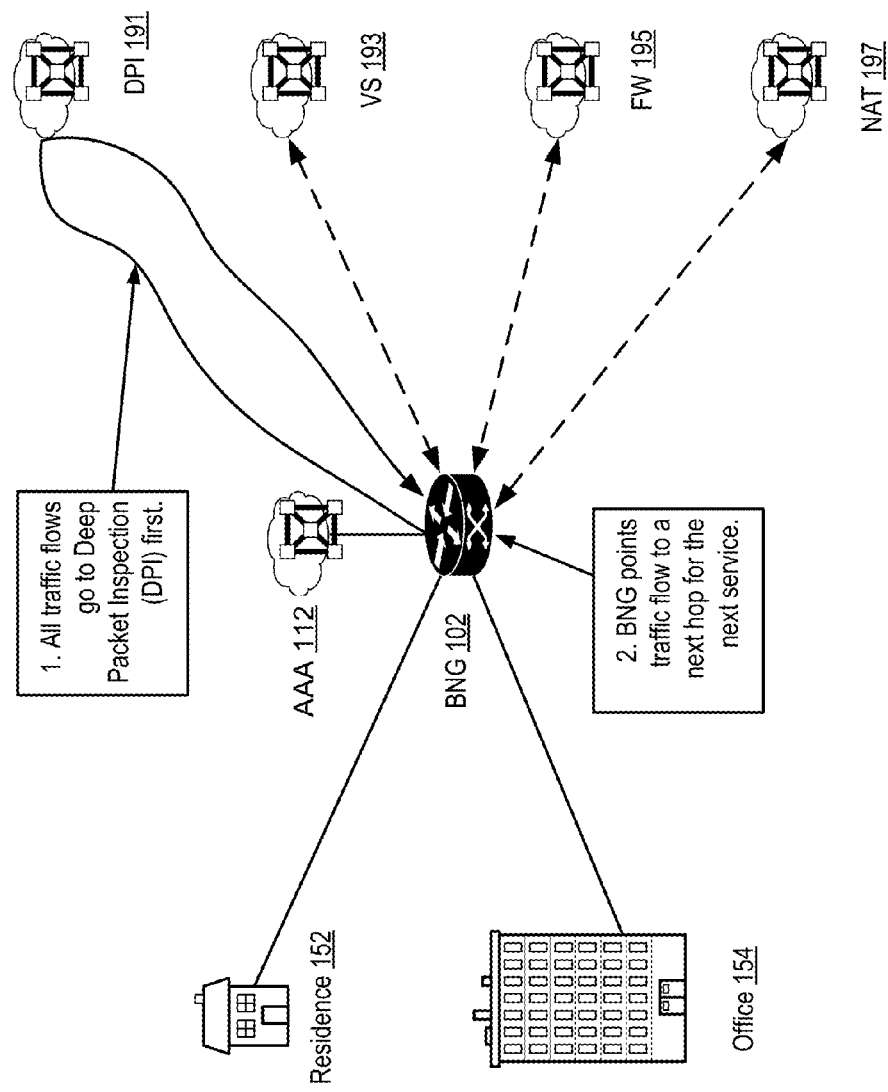
FIG. 1 illustrates an example of inline service chaining for broadband network customer traffic.

In the following description, numerous specific details are set forth. However, it is understood that embodiments of the invention may be practiced without these specific details. In other instances, well-known circuits, structures and techniques have not been shown in detail in order not to obscure the understanding of this description. It will be appreciated, however, by one skilled in the art that the invention may be practiced without such specific details. Those of ordinary skill in the art, with the included descriptions, will be able to implement appropriate functionality without undue experimentation.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to implement such feature, structure, or characteristic in connection with other embodiments whether or not explicitly described.

In the following description and claims, the terms "coupled" and "connected," along with their derivatives, may be used. It should be understood that these terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other. A "set," as used herein refers to any positive whole number of items including one item.

An electronic device (e.g., an end station, a network device) stores and transmits (internally and/or with other electronic devices over a network) code (composed of software instructions) and data using machine-readable media, such as non-transitory machine-readable media (e.g., machine-readable storage media such as magnetic disks; optical disks; read only memory; flash memory devices; phase change memory) and transitory machine-readable transmission media (e.g., electrical, optical, acoustical or other form of propagated signals—such as carrier waves, infrared signals). In addition, such electronic devices include hardware, such as a set of one or more processors coupled to one or more other components—e.g., one or more non-transitory machine-readable storage media (to store code and/or data) and network connections (to transmit code and/or data using propagating signals), as well as user input/output devices (e.g., a keyboard, a touchscreen, and/or a display) in some cases. The coupling of the set of processors and other components is typically through one or more interconnects within the electronic devices (e.g., busses and possibly bridges). Thus, a non-transitory machine-readable medium of a given electronic device typically stores instructions for execution on one or more processors of that electronic device to execute operations of embodiments of the invention as detailed herein below. One or more parts of an embodiment of the invention may be implemented using different combinations of software, firmware, and/or hardware.

As used herein, a network device (e.g., a router or a switch) is a piece of networking equipment, including hardware and software that communicatively interconnects other equipment on the network (e.g., other network devices, end systems). Some network devices are "multiple services network devices" that provide support for multiple networking functions (e.g., routing, bridging, VLAN (virtual LAN) switching, Layer 2 aggregation, session border control, Quality of Service, and/or subscriber management), and/or provide support for multiple application services (e.g., data, voice, and video). Subscriber end systems (e.g., servers, workstations, laptops, netbooks, palm tops, mobile phones, smartphones, multimedia phones, Voice Over Internet Protocol (VOIP) phones, user equipment, terminals, portable media players, GPS units, gaming systems, set-top boxes) access content/services provided over the Internet and/or content/services provided on virtual private networks (VPNs) overlaid on (e.g., tunneled through) the Internet. The content and/or services are typically provided by one or more end systems (e.g., server end systems) belonging to a service or content provider or end systems participating in a peer to peer service, and may include, for example, public webpages (e.g., free content, store fronts, search services), private webpages (e.g., username/password accessed webpages providing email services), and/or corporate networks over VPNs. Typically, subscriber end systems are coupled (e.g., through customer premise equipment coupled to an access network (wired or wirelessly)) to edge network devices, which are coupled (e.g., through one or more core network devices) to other edge network devices, which are coupled to other end systems (e.g., server end systems). A network device is generally identified by its media access (MAC) address, Internet protocol (IP) address/subnet, network sockets/ports, and/or upper OSI layer identifiers.

Network devices are commonly separated into a control plane and a data plane (sometimes referred to as a forwarding plane or a media plane). In the case that the network device is a router (or is implementing routing functionality), the control plane typically determines how data (e.g., packets) is to be routed (e.g., the next hop for the data and the outgoing port for that data), and the data plane is in charge of forwarding that data. For example, the control plane typically includes one or more routing protocols (e.g., an exterior gateway protocol such as Border Gateway Protocol (BGP) (RFC 4271), Interior Gateway Protocol(s) (IGP) (e.g., Open Shortest Path First (OSPF) (RFC 2328 and 5340), Intermediate System to Intermediate System (IS-IS) (RFC 1142), Routing Information Protocol (RIP) (version 1 RFC 1058, version 2 RFC 2453, and next generation RFC 2080)), Label Distribution Protocol (LDP) (RFC 5036), Resource Reservation Protocol (RSVP) (RFC 2205, 2210, 2211, 2212, as well as RSVP-Traffic Engineering (TE): Extensions to RSVP for LSP Tunnels RFC 3209, Generalized Multi-Protocol Label Switching (GMPLS) Signaling RSVP-TE RFC 3473, RFC 3936, 4495, and 4558)) that communicate with other network devices to exchange routes and select those routes based on one or more routing metrics. In addition, the control plane also typically include ISO layer 2 control protocols such as Rapid Spanning Tree Protocol (RSTP), Multiple Spanning Tree Protocol (MSTP), and SPB (Shortest Path Bridging), which have been standardized by various standard bodies (e.g., SPB has been defined in IEEE Std 802.1aq-2012).

Routes and adjacencies are stored in one or more routing structures (e.g., Routing Information Base (RIB), Label Information Base (LIB), one or more adjacency structures) on the control plane. The control plane programs the data plane with information (e.g., adjacency and route information) based on the routing structure(s). For example, the control plane programs the adjacency and route information into one or more forwarding structures (e.g., Forwarding Information Base (FIB), Label Forwarding Information Base (LFIB), and one or more adjacency structures) on the data plane. The data plane uses these forwarding and adjacency structures when forwarding traffic.

Typically, a network device includes a set of one or more line cards, a set of one or more control cards, and optionally a set of one or more service cards (sometimes referred to as resource cards). These cards are coupled together through one or more interconnect mechanisms (e.g., a first full mesh coupling the line cards and a second full mesh coupling all of the cards). The set of line cards make up the data plane, while the set of control cards provide the control plane and exchange packets with external network devices through the line cards. The set of service cards can provide specialized processing (e.g., Layer 4 to Layer 7 services (e.g., firewall, Internet Protocol Security (IPsec) (RFC 4301 and 4309), Intrusion Detection System (IDS), peer-to-peer (P2P), Voice over IP (VoIP) Session Border Controller, Mobile Wireless Gateways (Gateway General Packet Radio Service (GPRS) Support Node (GGSN), Evolved Packet Core (EPC) Gateway)). By way of example, a service card may be used to terminate IPsec tunnels and execute the attendant authentication and encryption algorithms.

As used herein, a node forwards IP packets on the basis of some of the IP header information in the IP packet; where IP header information includes source IP address, destination IP address, source port, destination port (where "source port" and "destination port" refer herein to protocol ports, as opposed to physical ports of a network device), transport protocol (e.g., user datagram protocol (UDP) (RFC 768, 2460, 2675, 4113, and 5405), Transmission Control Protocol (TCP) (RFC 793 and 1180), and differentiated services (DSCP) values (RFC 2474, 2475, 2597, 2983, 3086, 3140, 3246, 3247, 3260, 4594, 5865, 3289, 3290, and 3317). Nodes are implemented in network devices. A physical node is implemented directly on the network device, whereas a virtual node is a software, and possibly hardware, abstraction implemented on the network device. Thus, multiple virtual nodes may be implemented on a single network device.

A network interface may be physical or virtual; and an interface address is an IP address assigned to a network interface, be it a physical network interface or virtual network interface. A physical network interface is hardware in a network device through which a network connection is made (e.g., wirelessly through a wireless network interface controller (WNIC) or through plugging in a cable to a port connected to a network interface controller (NIC)). Typically, a network device has multiple physical network interfaces. A virtual network interface may be associated with a physical network interface, with another virtual interface, or stand on its own (e.g., a loopback interface, a point to point protocol interface). A network interface (physical or virtual) may be numbered (a network interface with an IP address) or unnumbered (a network interface without an IP address). A loopback interface (and its loopback address) is a specific type of virtual network interface (and IP address) of a node (physical or virtual) often used for management purposes; where such an IP address is referred to as the nodal loopback address. The IP address(es) assigned to the network interface(s) of a network device, are referred to as IP addresses of that network device; at a more granular level, the IP address(es) assigned to network interface(s) assigned to a node implemented on a network device, can be referred to as IP addresses of that node.

Some network devices include service/functionality for AAA (authentication, authorization, and accounting) protocols (e.g., RADIUS (Remote Authentication Dial-In User Service), Diameter, and/or TACACS+ (Terminal Access Controller Access Control System Plus). AAA can be provided through a client/server model, where the AAA subscriber is implemented on a network device and the AAA server can be implemented either locally on the network device or on a remote end station (e.g., server end station) coupled with the network device. Authentication is the process of identifying and verifying a subscriber. For instance, a subscriber might be identified by a combination of a username and a password or through a unique key. Authorization determines what a subscriber can do after being authenticated, such as gaining access to certain end station information resources (e.g., through the use of access control policies). Accounting is recording user activity. By way of a summary example, subscriber end stations may be coupled (e.g., through an access network) through an edge network device (supporting AAA processing) coupled to core network devices coupled to server end stations of service/content providers. AAA processing is performed to identify the subscriber record for a subscriber. A subscriber record includes a set of attributes (e.g., subscriber name, password, authentication information, access control information, rate-limiting information, policing information) used during processing of that subscriber's traffic. Other services, such as deep packet inspection (DPI) service, network address translation (NAT) service firewall (FW) service, and virtual scanning (VS) service may also be provided in a network for subscribers. As discussed herein below, these services may be performed in sequence thus offers service chain.

Objectives of Optimization in Service Chaining & Existing Solutions

In servicing chaining, the requirements for traffic steering solution are: efficiency, flexibility, scalability, and openness. With regard to the efficiency requirement, traffic should traverse middleboxes in the sequence specified by the network operators and should not unnecessarily traverse middleboxes. Great capital expenditure (CAPEX) savings could be achieved if traffic could be selectively steered through or steered away (bypassed) from specific services.

With regard to the flexibility requirement, a traffic steering solution should support subscriber, application, and operator specific policies simultaneously, all stemming from a single control point. Adding or removing new services should be easily done by the network operator.

With regard to the scalability requirement, a traffic steering solution should support a large number of rules and scale as the number of subscribers/applications grows. The ability to offer a per-subscriber selection of inline services could potentially lead to the creation of new offerings and hence new ways for operators to monetize their networks.

In addition, with regard to the openness, it should be possible to deploy any type of middlebox in the network. Deployment of the middlebox should be vendor independent in order to avoid vendor lock-in. Further, network operators should be able to leverage their current investment by reusing their existing middleboxes without modifications.

In general, network operators use policy-based routing (PBR) to forward the subscriber traffic towards the right services. They may also use access control lists (ACLs), virtual local area networks (VLANs), or other tunneling techniques to forward the packets to the right place. In some cases, service chaining can be partly performed by the services themselves, leaving less control to the operator over the remaining hops in a service path. In this case, the services must be configured to direct traffic to the next hop in the chain if the service box is not directly connected to the next hop.

FIG. 1 illustrates an example of inline service chaining for broadband network customer traffic. In network 100, it is assumed that regular residential traffic flows from resident 152 needs deep packet inspection (DPI) service, DPI 191, and network address translation (NAT) service, NAT 197. Premium residential traffic flows from resident 152 receives the same services in addition to firewall (FW) service, FW 195, and virtual scanning (VS) service, VS 193. Enterprise traffic flows from office 154 do not require service NAT 197, but they do need services DPI 191, FW 195 and VS 193. In this example, all traffic flows go through DPI 191 first at task box 1, and then the traffic flows go back to border network gateway (BNG) 102. At task box 2, BNG 102 directs the traffic flows to respective right next hop services such as VS 193, FW 195, and NAT 197 depending on the service sequences of the traffic flows.

The subscriber session authentication, authorization, and accounting (AAA) driven policy can define the first hop service at AAA 112 associated with BNG 102; however, this subscriber context information is no longer associated with the returned traffic from the DPI 191 after task box 1. Hence, determining the next service for a specific flow becomes non-trivial.

One approach to providing services to a network is to use a single box that runs multiple services. This approach consolidates all inline services into a single networking box (e.g., a router or a gateway) and hence avoids the need of dealing with inline service chaining configuration of the middleboxes. The operator adds new services by adding additional service cards to the single networking box.

The single box approach cannot satisfy the openness requirement as it is hard to integrate existing third party service appliances. This solution also suffers from scalability issues as the number of services and the aggregated bandwidth is limited by the capacity of the single box. Also, the number of slots in the chassis of the single box is limited.

A second approach to providing services to a network is to use statically configured service chains. One or more static service chains are configured, and each service is configured to send traffic to the next service in its chain. A networking box (e.g., a router or a gateway) classifies incoming traffic and forwards the traffic to services at the head of each chain based on the result of the classification.

The statically configured service chain approach does not support the definition of policies in a centralized manner and instead requires that each service be configured to classify and steer traffic to the appropriate next service. This approach requires a large amount of service specific configuration and is error prone. It lacks flexibility as it does not support the steering of traffic on a per subscriber basis and limits the different service chains that can be configured. Getting around these limitations would require additional configuration on each service to classify and steer traffic.

A third approach to providing services to a network is policy based routing (PBR). With the PBR approach, a networking box (e.g., a router or a gateway) using PBR is provided. Each service is configured to return traffic back to the networking box after processing the traffic. The networking box classifies traffic after each service hop and forwards it to the appropriate service based on the result of the classification. This approach suffers from scalability issues as traffic is forced through the networking box after every service. The network box must be able to handle N times the incoming traffic line rate to support a chain with N−1 services.

Additionally, a fourth approach providing services to a network is to use a policy-aware switching layer. A policy-aware switching layer for data centers explicitly forwards traffic through difference sequences of middleboxes. Using this approach satisfies the efficiency requirement but fails to meet the requirements of flexibility and scalability as each policy needs to be translated into a set of low level forwarding rules on all the relevant switches. Also, there is no explicit way to configure application related and subscribers related rules separately. They need to be manually consolidated into a set of low level rules. Moreover, it requires installing one rule for each new flow. Therefore, it is hard to scale with the number of subscriber/application combinations.

In the co-pending U.S. patent applications, the inventors aimed at addressing routing among services within a network, where a given subscriber follows a chain of services with a pre-determined order. Yet, in some applications, subscribers do not need to follow chains of services with pre-determined order. In these applications, a solution is needed for both optimally (1) placing services (middleboxes) and (2) ordering the services to traverse by subscribers. One objective of such solution may be to minimize the average time it takes for the subscriber's traffic to go through the required services.

Network Configurations and Operations

Figure 2:
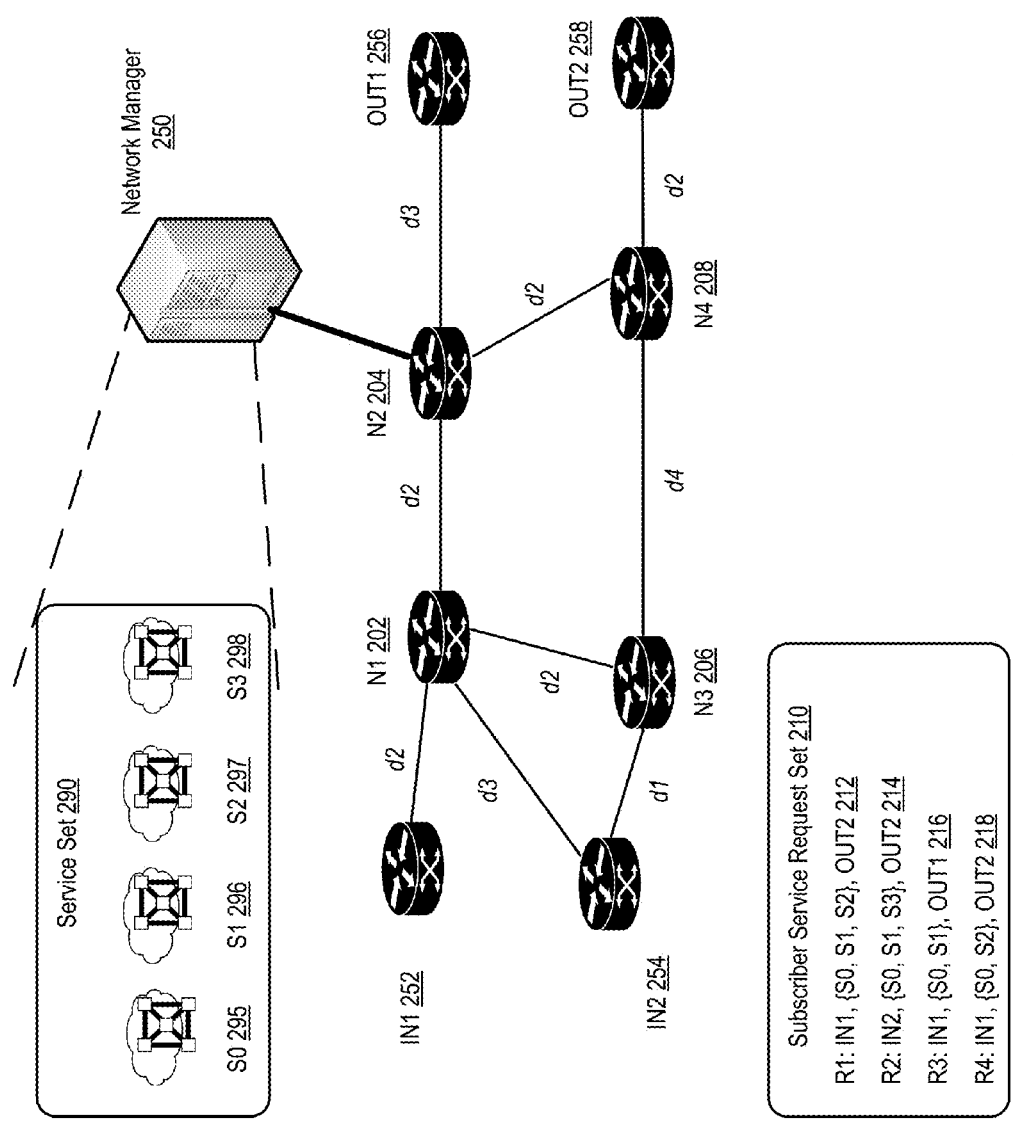
FIG. 2 is a block diagram illustrating a network that can implement traffic steering according to one embodiment of the invention.

FIG. 2 is a block diagram illustrating a network that can implement traffic steering according to one embodiment of the invention. Network 200 contains network manager 250. Network manager 250 can be a network management system (NMS), an element management system (EMS), or other centralized network manager of network 200. Network 200 also contains network devices, nodes N1-N4 for traffic forwarding/processing at references 202-208 respectively. N1-N4 can be a router, a switch, or other networking equipment as described herein above. In one embodiment, network manager 250 is integrated with one network device, such as network device N2 at reference 204. In other words, network manager 250 may not be a standalone entity in network 200, and some network device may perform functionalities of network manager 250.

Network 200 contains two ingress points IN1 and IN2 at references 252 and 254 respectively. An ingress point (or simply ingress) is where traffic flows into network 200 (for example, residence 152 or office 154 illustrated in FIG. 1). Network 200 also contains two egress points OUT1 and OUT2 at references 256 and 258 respectively. An egress point (or simply egress) is where traffic flows out of network 200, for example, into Internet cloud. IN1, IN2, OUT1, and OUT2 are network devices that reside at the border of network 200, and they may or may not be installed services. Note an egress point and ingress points are relative terms, and a network device may be an egress point for one subscriber and an ingress point for another subscriber at the same time, thus IN1 252 and IN2 254 can be egress points and OUT1 256 and 258 can be ingress points. The designation is for simplicity of illustration only.

The ingress points, egress points, and nodes are communicatively coupled through communication links between the entities. Each communication link, or link, is one of a power line, a radio frequency channel, an optical fiber, a copper line, and other suitable medium for communication (e.g., fluid, gas, or solid molecule vibration or motion), depending on implementation. The delay of each link is labeled next to the link, for example, the link between IN2 254 and N3 206 has a delay of d1 unit. The definition of delay unit varies per implementation and embodiments of the invention take such delay units as input.

Service set 290 represents services to be allocated to network 200. Services 295-298 may be services such as DPI 192, VS 193, FW 195, and NAT 197 as illustrated in FIG. 1. Services within service set 290 do not need to be performed in order, i.e., a subscriber may be required to be served by several services but the order of the serving may be determined by a network operator, and not requested by the subscriber.

Traffic steering in a network such as network 200 contains two components. One component is to place services within the network so that each service is associated with a network device (ingress point, egress point, or a node). The other component is to determine the order of services for each subscriber. This traffic steering process only needs to be performed once for a given traffic flow between any two border networking boxes, regardless of the number of nodes that connects them.

Box of subscriber service request set 210 in FIG. 2 illustrates the traffic steering problem. Subscriber service request set 210 contains four subscribers R1 to R4, and each needs to traverse a list of ingress/egress points and services. Not the services for each subscriber are included in a pair of curly brackets denoting that the order of the services is not predetermined. For example, for R1, the services to traverse are {S0, S1, S2}, which means that R1 may traverse the services in any order of S0, S1, and S2. In other words, a network manager 250 may determine an optimal order of services (say S1→S0→S2) based on its operational efficiency or its need to enhance subscriber experience. Note in some embodiment, even the ingress/egress points are not predetermined, and a subscriber may come to a number of different ingress points and leave from a number of different egression points. In that case, a service request for R1 may be denoted as IN1|IN2, {S0, S1, S2}, OUT1|OUT2, which means either IN1 or IN2 can be the ingress point and either OUT1 or OUT2 can be the egress point.

In one co-pending U.S. patent application Ser. No. 13/751,826, a set of methods and system is disclosed to minimize the average time it takes for subscribers' traffic to go through the required services for services with predetermined orders to be served. Embodiments of the current invention aims at minimizing the average time it takes for subscribers' traffic to go through the required services when subscribers may be served by services without predetermined orders.

In devising ways to minimize the average time it takes for subscribers' traffic to go through the required services, it is assumed that delay between any two nodes (ingress/egress points and network nodes) in a network is known. The delay may be characterized in a variety of ways, such as relative delay units or actual time delay periods, the embodiments of the invention does not focus on the method of delay is characterized, it simply takes delay between nodes in the network as input and determine a service placement and service order to minimize the average delay for the subscriber's traffic.

Mathematical Formulation for Solutions of Services Placement and Ordering

The problem of service placement can be formulated as a graph problem. Given a set of m subscribers and a set of n services in the network, the issue to address is: Where should the services be placed in the network such that a measurement of subscriber delay is the smallest? Note subscriber delay is measured against a metric an operator may choose. It can be also translated to find where to place services such that the paths are the shortest, if path length is a proxy of subscriber delay. Of course, other metrics are possible. In fact, the particular metric selected by an operator is the input of the graph problem and can be formulated as an operator desires.

Assume $S=\{s_1, s_2, \ldots, s_n\}$ be the ordered set of all available services. The ordering is based on the number of subscribers requiring each service. Therefore, $s_0$ is the service that is required by the largest subset of subscribers, and $s_n$ is the service that is required by the smallest subset of subscribers.

Starting from $s_0$, one may place services one after another and update subscribers' paths in two steps:

1) For each service $s_i$, one may pick the location in the network that is (on average) closest to the current path of all subscribers. The strategy is explained in more detail herein below.
2) One then may update the path of each subscriber by including the new service and the node that the service is placed at. Only paths of those subscribers who require the service need to be updated.

One may apply these two steps for all n services until all services are placed in the network and subscribers' paths are completed.

Figure 3:
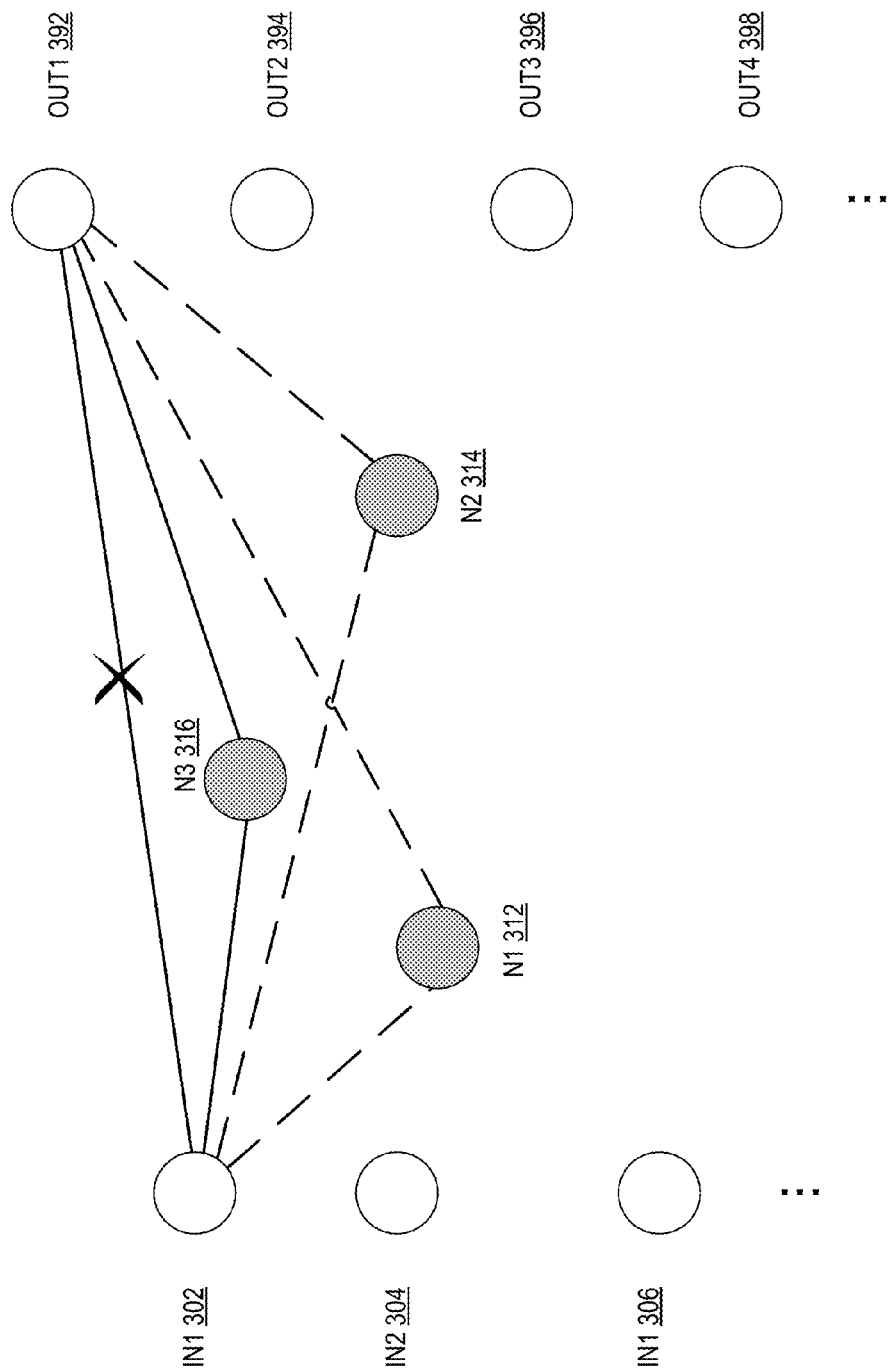
FIGS. 3-4 illustrate a service placement process according to one embodiment of the invention.
Figure 4:
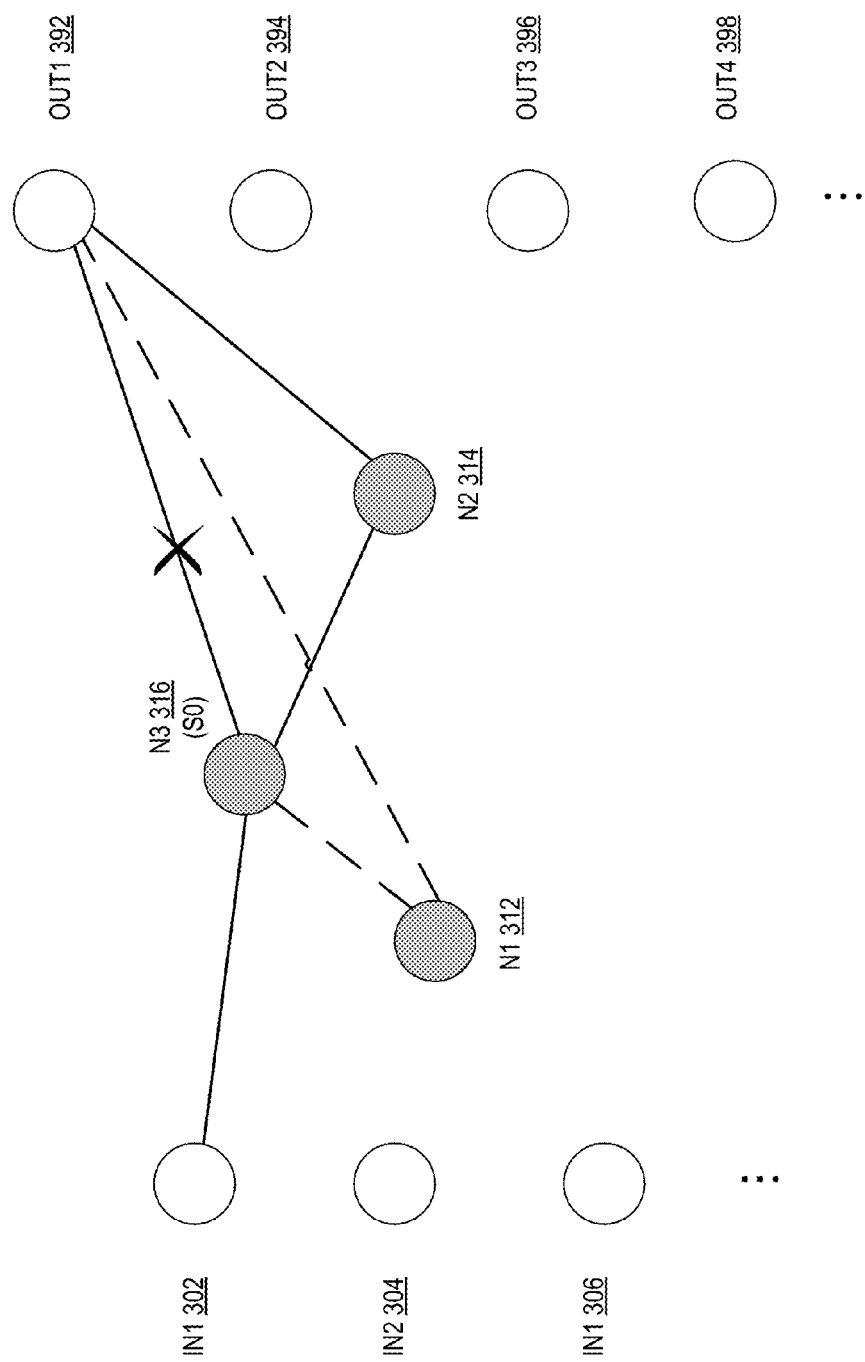

FIGS. 3-4 illustrate a service placement process according to one embodiment of the invention. FIG. 3 illustrates an abstraction of a network. The network contains three ingress points IN1 to IN3 at references 302 to 306 and four egress points at references 392 to 398 respectively. The network contains at least three nodes N1-N3 at references 312 to 316 respectively. Services $s_0$ and $s_1$ need to be placed in the network, and Service $s_0$ is required by no less subscribers than service $s_1$, thus, the service set is defined as, $S=\{s_0, s_1\}$.

Referring to FIG. 3, the initial path in the network when no service has been placed is between pairs of ingress and egress points. That is, ingress IN1 at reference 302 is connected to egress OUT1 at reference 392. Then the method picks a location for $s_0$ in the network that is closest to the current path of all subscribers. As noted earlier, S is ordered based on the number of subscribers requiring each service, thus number of subscribers requiring $s_0$ is no less than the number of subscribers requiring $s_1$. The possible locations for service $s_0$ are the nodes N1-N3. The selection is to pick a location and calculate how close the location is to the current paths such as IN1-OUT1. The distance of the location is calculated based on the added distance (associated with the delay added by the location) due to the new location.

In this example, the selection first picks N3 316 as $s_0$ location, and it calculates the delay added at path IN1-N3-OUT1. Similarly, the selection picks N1 312 and N2 314 as $s_0$ location respectively, and it calculates the delay added at paths IN1-N1-OUT1 and IN1-N2-OUT1 respectively. It then determines which one path is closest to the existing path IN1-OUT1. If there are additional current paths (such as IN2 to OUT2, IN3 to OUT3, etc), the calculation continues for the other paths. Assuming that N3 adds the least delay to the existing paths, service $s_0$ is then placed at N3. Next, service $s_0$ is added to all subscribers' paths where the subscribers require the service. Since service $s_0$ is the first service added to all subscribers' path (prior to that, only ingress/egress points exist on each subscribers' path), there is no ordering needs to be decided, $s_0$ is inserted after the subscriber's ingress point and prior to the subscriber's egress point.

Referring now to FIG. 4, where service $s_0$ has been placed at N3 at reference 316 and now service $s_1$ needs to be placed. A path for one subscriber is illustrated with the solid lines at IN1-N3-OUT1. For placing service $s_1$, again the distances between a candidate node to the current paths of all subscribers are calculated. The possible locations for service $s_1$ are the nodes N1-N3 again. The selection is to pick a location and calculate how close the location is to the current paths such as IN1-N3-OUT1. The distance of the location is calculated based on the added distance (associated with the delay added by the location) due to the new location.

Repeating for $s_1$ the calculation performed for $s_0$, and the method determines that locating at N2 adds the least delay, thus service $s_1$ is then placed at N2. Next, service $s_1$ is added to all subscribers' paths where the subscribers require the service. Note that service $s_1$ can be added to any location within the service chain of a subscriber's path, and the method selects a position within the service chain resulting in the least additional delay.

Figure 5:
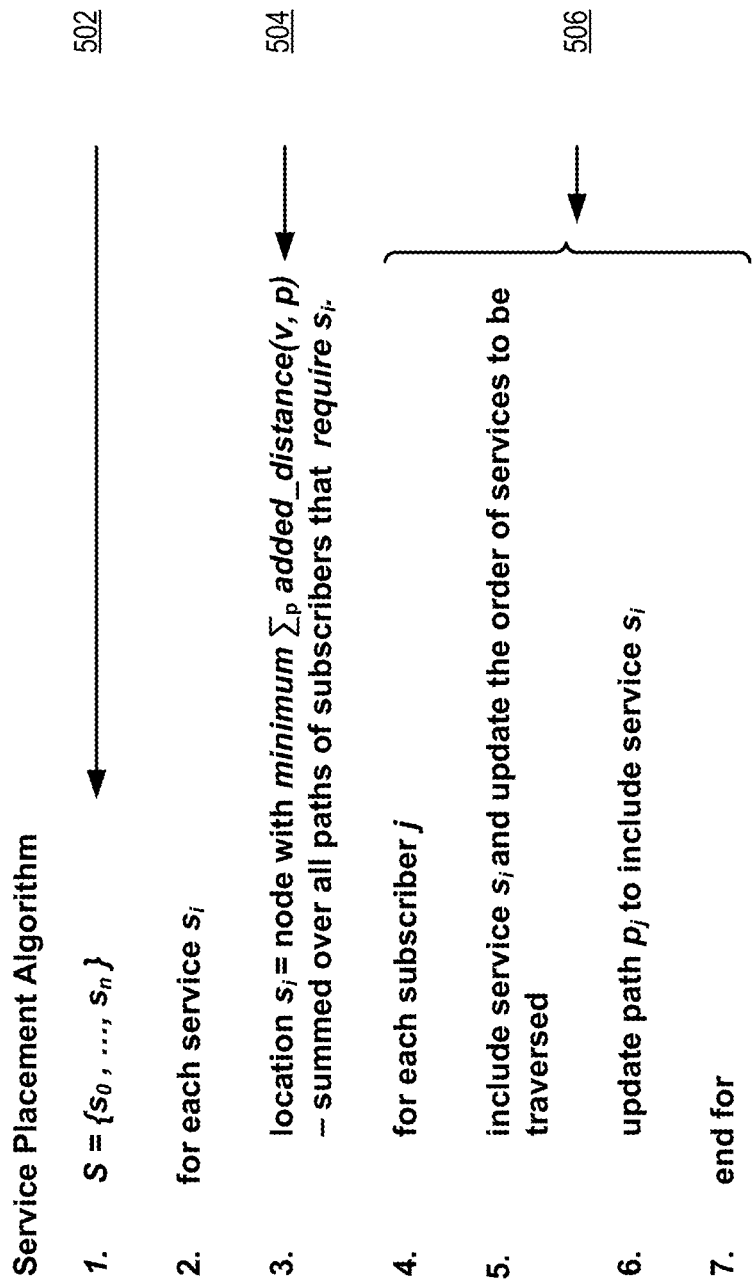
FIG. 5 illustrates a pseudo code implementing a service placement and ordering process according to one embodiment of the invention.

FIG. 5 illustrates a pseudo code implementing a service placement and ordering process according to one embodiment of the invention. At reference 502, $S=\{s_0, s_1, \ldots, s_n\}$ is set to be the ordered set of all available services, where $s_0$ is the service that is required by the largest subset of subscribers (i.e., the most utilized service) and $s_n$ is the service that is required by the least subset of subscribers (i.e., the least utilized service).

Then for each service, starting from the most utilized one, a service location is selected at reference 504. For each iteration of i (the outer loop), subscribers' paths are updated to include service $s_i$, where the criteria to select a node location with the minimum additional delay for the all paths of subscriber requiring service $s_i$.

Assume a subscriber's path at the beginning of an iteration is:
Path p=Ingress→x→y→ . . . →Egress
That is, in the previous iterations, services needed by this subscriber were placed at some nodes named x, y, and so on. Each part of path p (between ingress and x, between x and y, and so on) may be referred to as a segment of the path. The added distance between a node v (v can be any available node of the system) in the network and path p is defined as the following:

$$\text{added\_distance}(v,p) = \text{minimum}(d(v,a)+d(v,b)-d(a,b))$$

Where a→b is a segment of path p, and d(a, b) is the distance between the two nodes a and b. Note the d(a, b) can be either the delay between the two nodes, the number of hops between the two nodes, or any other metric an operator selects as a metric to measure delay between the two nodes.

Figure 6:
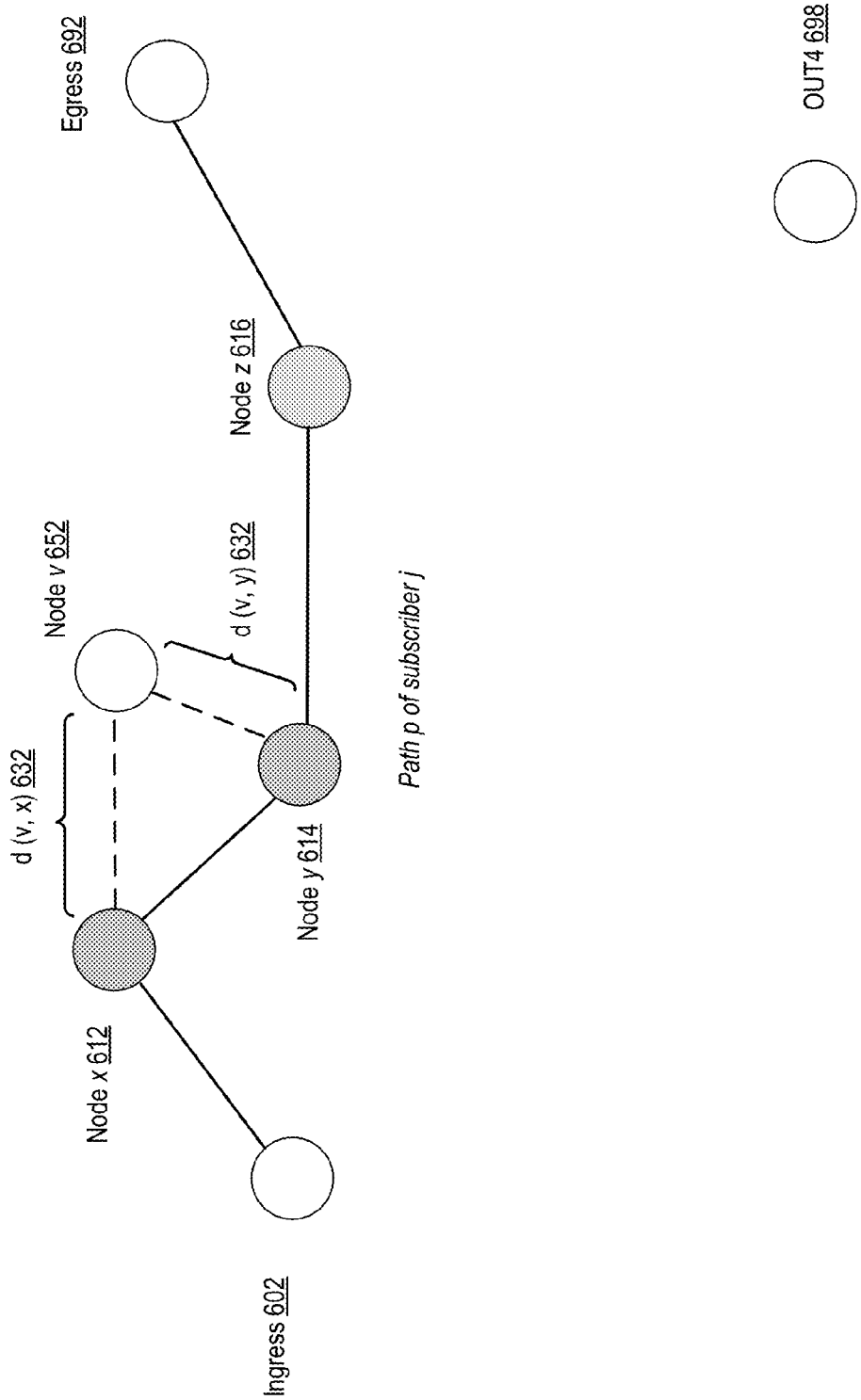
FIG. 6 illustrates a service placement process according to one embodiment of the invention.

FIG. 6 illustrates a service placement process according to one embodiment of the invention. As illustrated, path p contains four segments: ingress→node x, node→x node y, node y→node z, node z→egress. Nodes x, y, and z are the locations of three previously placed services. Assuming a node v is closest to segment x→y of path p. The added distance introduced by placing service $s_i$ at node v for path p will be d(v, x)+d(v, y)−d(x, y), which is the minimum additional delay for path p. The added_distance (v, p) is added to all the other existing paths. One node with the minimum sum of additional delay is selected to be the node placing service $s_i$. For service $s_i$, the selected node may be designated as $l_i$ (location of service $s_i$). Thus, location of service $s_i=l_i=$node with minimum distance (v, p), minimum over all nodes v in the network and paths p of subscribers that require service $s_i$.

Figure 7:
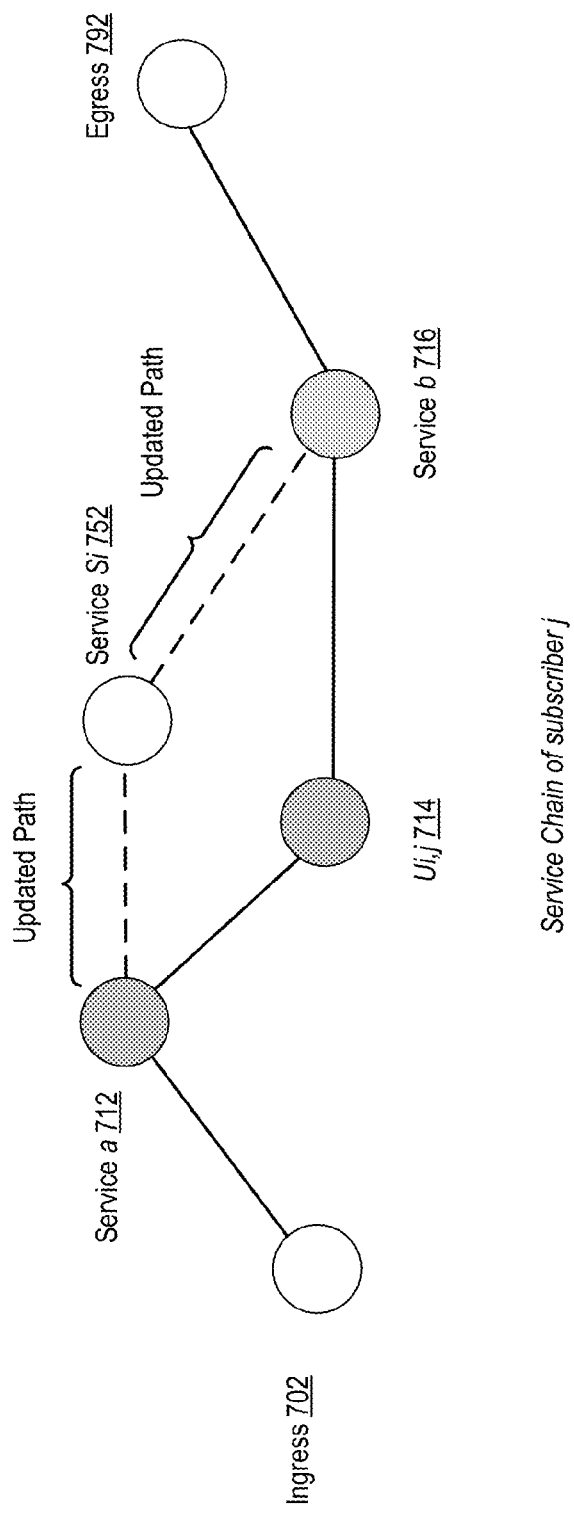
FIG. 7 illustrates a service ordering process according to one embodiment of the invention.

Once the service is placed, the next step is to determine the order of services of the paths adding the service. FIG. 7 illustrates a service ordering process according to one embodiment of the invention. In the previous step, location of service $s_i$ is determined to be at $l_i$. Assuming the node on subscriber j's path closest to node $l_i$ is $U_{i,j}$ at reference 714. With delay at each link within a network is known, one may find the closest node to $l_i$.

$U_{i,j}$ is on the path between service a ($s_a$) at reference 712 and service b ($s_b$) at reference 716. The path then will be updated with service $s_i$, where $s_i$ is placed in the chain of services after $s_a$ and before $s_b$ which results the least additional delay for the path. Obviously, when $s_i$ is the first service (thus no two services on the path already), there is no need to determine service order, and it will be placed in the chain. When $s_i$ is the second service (only one existing service on the path already), one needs to determine whether putting $s_i$ before or after the existing service results in a less delay for the path and place $s_i$ to the chain of service to get the less delay.

Referring back to FIG. 5, steps at reference 506 determines the service ordering for subscriber j, and the inner loop repeats the process for each subscriber j. The process ends when all the subscribers have their respective services places and ordered as discussed herein above.

The support of service chaining can be performed at network manager 250 as illustrated in FIG. 2. Network manager 250 may be an EMS/NMS/other central network manager. In alternative embodiments, the support of service chaining may be performed in emerging technologies such as software defined networking (SDN) system and network function virtualization (NFV).

Embodiments in SDN and NFV

The support of service chaining can be conveniently integrated with in SDN and NFV systems, where control function and data forwarding function may be separated.

Figure 8:
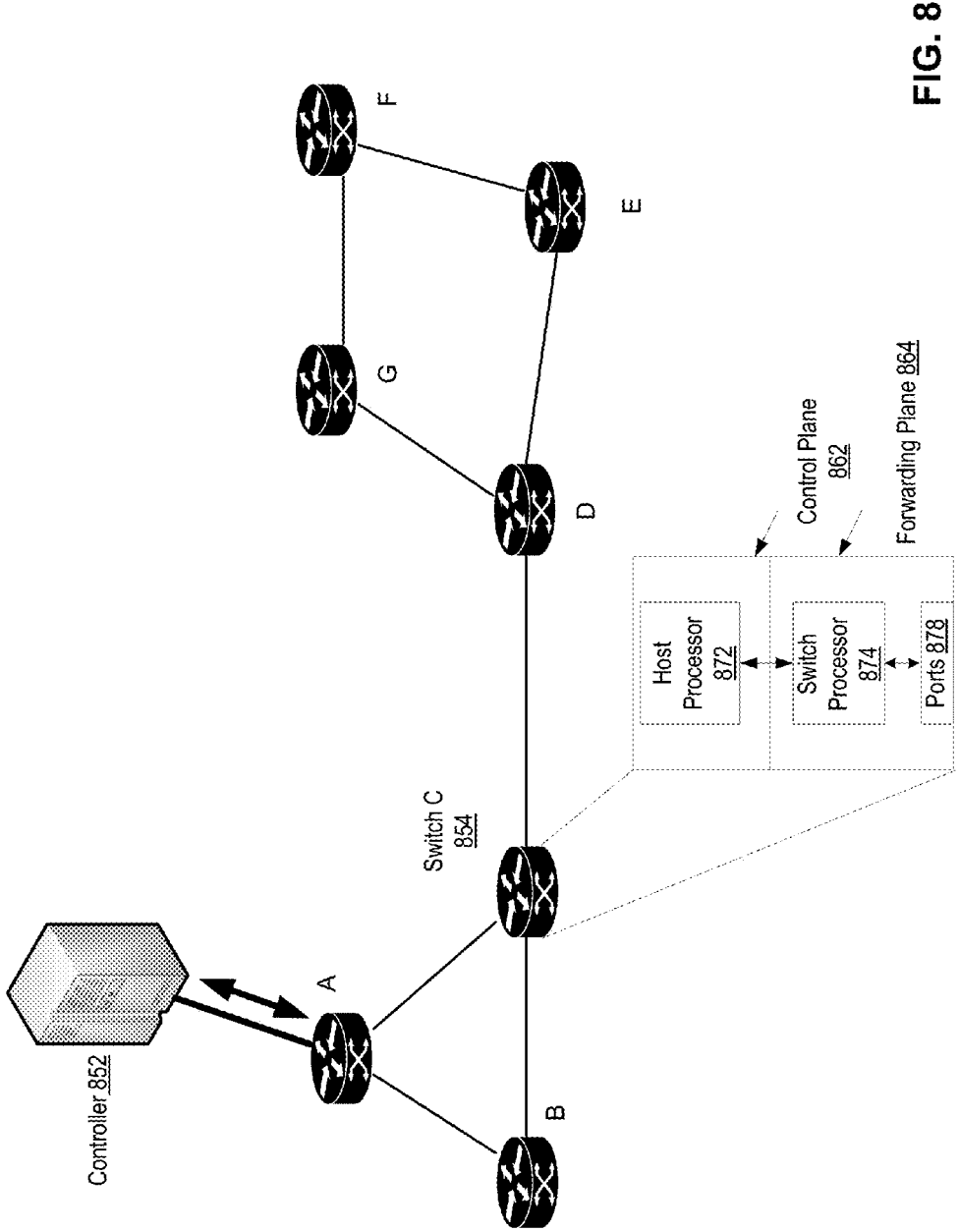
FIG. 8 is a block diagram illustrating a SDN network.

FIG. 8 is a block diagram illustrating a SDN network. SDN network 800 comprises a number of forwarding elements and a number of controllers that instruct the forwarding elements' forwarding behavior. Note a SDN network may contain a much larger number of network devices and existing network devices may be implemented with SDN compatible protocols thus become a part of a SDN network (e.g., an existing IP router may support OpenFlow protocol and thus become a SDN forwarding element or a SDN controller). Thus SDN network 800 is for illustrating logical SDN network configuration only.

Forwarding Elements

The main task of a SDN forwarding element (referred to as an OpenFlow switch or simply switch in OpenFlow parlance when the SDN complies with OpenFlow standards), is to forward packets within the SDN forwarding element from an ingress port to an egress port, according to the rules in flow tables programmed by one or more SDN controllers. Each flow entry contains a set of actions such as forwarding packets to a given port, modifying certain bits in a packet header, encapsulating packets to the SDN controller, or dropping the packets. For the first packet in a new flow, the forwarding element often forwards the packet to the SDN controller to trigger the new flow being programmed. It can also be used to forward slow-path packets such as Internet Control Message Protocol (ICMP) packets to the SDN controller for processing. Note that the concept of a flow can be defined broadly, e.g., a TCP connection, or all traffic from a particular MAC address or IP address. Also note that a packet within a SDN network is defined broadly and it may be an Ethernet frame, an IP network packet, or a message in a proprietary format.

SDN Controllers

A SDN controller (often referred to as a remote controller or controller) adds and removes flow-entries from a flow table. It defines the interconnection and routing among a set of SDN forward elements and other network devices. It also handles network state distribution, such as collecting information from the set of SDN forward elements and distributing forwarding/routing instructions to them. The SDN controller can also be programmed to support new addressing, routing, and complex packet processing applications. The SDN controllers are the "brains" of a SDN network. A forwarding element needs to connect to at least one SDN controller to function correctly.

Referring to FIG. 8, SDN network 800 contains SDN controller 852 and a set of forwarding elements (or SDN switches, the terms "forwarding element" and "SDN switch" are used interchangeably herein below) A-G. Controller 852 (the terms "controller" and "SDN controller" are used interchangeably herein below) manages SDN switches A-G, and an SDN switch connects to its managing controller through a communication channel and the SDN switch not necessarily has a direct connectivity to a controller (thus the term "remote" controller).

An SDN switch can be viewed logically as containing two main components. One is a control plane and the other is a forwarding plane. A zoom-in view of SDN switch C at reference 854 illustrates the two planes. SDN switch C contains control plane 862 and forwarding plane 864. Control plane 862 coordinates management and configuration of SDN switch C. Configuration of forwarding plane 864 is achieved by running applications on host processor 872. Host processor 872 usually runs an operating system in order to provide a well-known development environment. Commands from host processor 872 are sent to the switch processor 874 using an interconnect (e.g., a peripheral component interconnect (PCI) bus). Exception packets (e.g., packet for routing and management) are often processed on host processor 872. Switch processor 874 interacts with various forwarding ports 878 of SDN switch C to forward and otherwise process incoming and outgoing packets.

Forwarding plane 864 is responsible for forwarding traffic (forwarding operations includes switching, routing, learning, etc.). It contains switch processor 874 that is designed to provide high throughput at the detriment of a more complex and flexible development environment. Different types high performance memory and hardware accelerator are often found on board of switch processor 874 for achieving the high throughput. In contrast, host processor 872 can be more complex and flexible at the detriment of providing high throughput as it processes more control packets (often referred to as slow path packets) than data packet thus throughput is less mission critical. When a SDN switch (e.g., SDN switch C) receives a packet associated with a new flow, it does not know where to forward the packet. Thus it sends the packet to its managing SDN controller, controller 852 in this example. Controller 852 receives the packet, and it programs a new flow entry and sends to SDN switch C. SDN switch C then forwards the packet according to the new flow entry.

In an SDN network, the support of service chaining discussed herein above may be implemented at the SDN controller, which then guides forwarding elements such as switches to serve services according to an ordered service chain determined from methods discussed herein above.

Flow Diagram of Services Placement and Ordering

Figure 9:
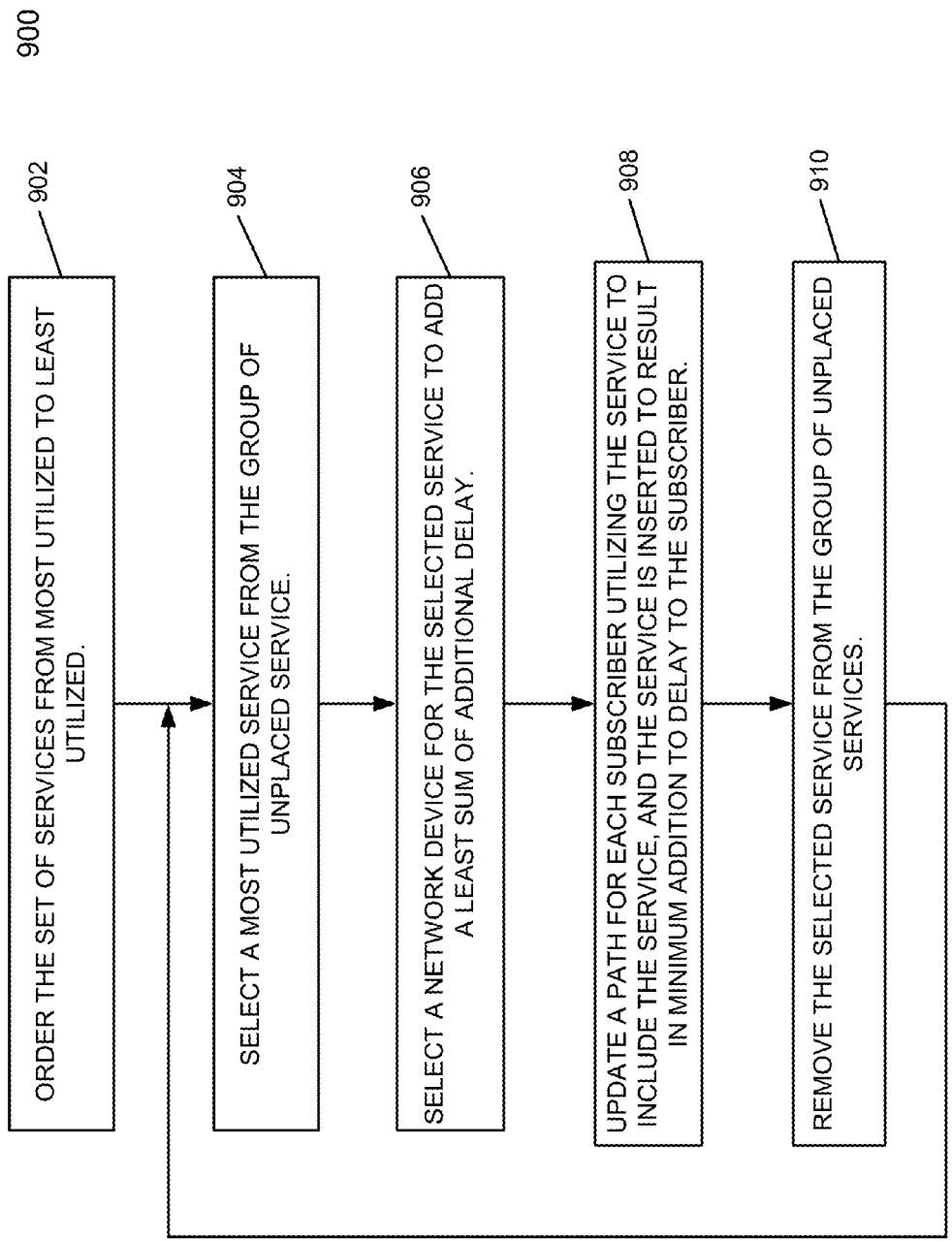
FIG. 9 is a flow diagram illustrating service placement and ordering according to one embodiment of the invention.

FIG. 9 is a flow diagram illustrating service placement and ordering according to one embodiment of the invention. Method 900 may be implemented in a network manager of a traditional network or a SDN controller of a SDN network. The network manager or SDN controller is aware of service chains of the network that subscribers are to be served through and it performs the task of placing services offered to subscribers to various network elements (e.g., routers, bridges, and SDN switches) and order the services to be served aiming at reducing overall delay.

The knowledge of subscribers delay at using network devices may be based on historical data of subscribers' delay over a period of time. It may also be based on delay information provided (e.g., by the operator). The operations of method 900 are described below using a network manager as an example and a SDN controller follows the same process.

At operation 902, the network manager orders the group of one or more services to be placed from the most utilized service to the least utilized service. At operation 904, the most utilized service from the group of one or more services is selected to be placed at a network device.

Then at operation 906, the network manager selects a network device for the selected service to add the least sum of additional delay. The selection is based on services already placed in the network, and the additional delay for each subscriber at a given network device is determined based on the smallest additional delay one of the node on the path of the subscriber as discussed herein above. The sums of additional delay for the selected service placing at each network device are then compared, and the network device resulting in the least sum of additional delay is selected for the service.

At operation 908, the path for each subscriber utilizing the selected service is updated to include the service. The service is inserted to result in minimum addition to existing delay of the existing path of the subscriber. Operation 908 may be repeated multiple times, one iteration for one subscriber.

At operation 910, since the selected service is placed at a network device and it has been placed in the chains of services for each subscriber utilizing the service, the selected service is removed from the group of services to be placed. The process returns to operation 904, where the updated group selects its now most utilized service. The process reiterates until all the services are placed and service ordering is determined in the chains of services.

Note each chain of service may include an ingress at the beginning of the chain and an egress at the end of the chain, and each of ingress and egress is a network device of the network. In some embodiments, services are weighted differently when calculating the sum of additional delay. Thus, delay of services carrying larger weight in delay calculation will result in lesser delay than otherwise. In addition, delay caused to subscribers is weighted differently at different network links of the network in one embodiment. Some links may have higher priority than another, and these links may give higher weight in calculating delay so that subscribers are routed away from the links. Also the group of services to be placed initially may contain all the services or only a subset of all the services to be placed. In the former case, all the service placement and ordering uses the methods discussed herein above; while in the latter case, only part of service placement and ordering use the methods discussed herein above.

Network Devices Implementing Service Placement and Ordering Method

Figure 10:
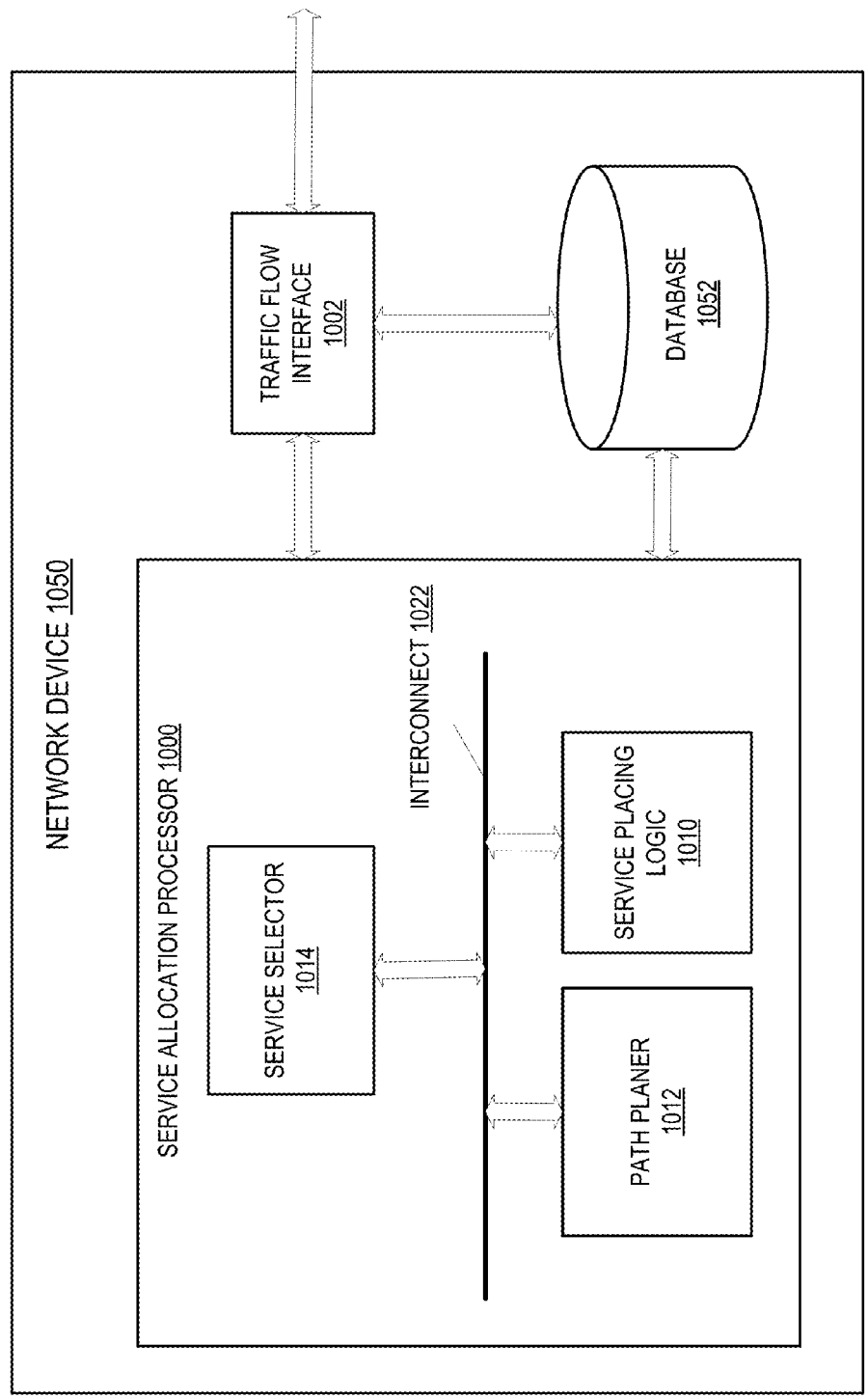
FIG. 10 is a block diagram illustrating a network device containing a processor implementing methods of service placement and ordering according to one embodiment of the invention.

FIG. 10 is a block diagram illustrating a network device containing a processor implementing methods of service placement and ordering according to one embodiment of the invention. Network device 1050 is coupled to a network. Each subscriber utilizes a subset of a set of services offered in the network. Note the order of the service chains is to be determined. A group of services are to be placed to be associated with a set of network devices of the network. In one embodiment, each service chain includes an ingress point at the beginning and an egress point at the end of the service chain respectively. Service allocation processor 1000 may be a standalone processor or a part of a processor within a SDN controller of a SDN network or a network device of a traditional network. That is, network device 1050 may be a SDN controller or a network device of the network. When service allocation processor 1000 is a part of a larger processor, it may have a dedicated network processing unit (NPU) or a share processing unit with other application.

Network device 1050 contains a traffic flow interface 1002 configured to collect information about the delay caused to the subscribers of the network and the services utilizing the services and service chains. The information may be collected over a period of time. The delay information is the basis of the service placement and ordering. Network device 1050 also contain database 1052. Database 1052 may be configured to store one or more delay information experienced by subscribers on various links.

Service allocation processor 1000 may contain service selector 1014, service placing logic 1010, and path planner 1012. These various modules are interconnected through interconnect 1022. Note that these various modules can be implemented as a single unit or multiple units, the unit or units integrate various modules and perform similar function as the modules of service allocation processor 1000, and these modules can be implemented in software, hardware or a combination thereof. Some modules illustrated in FIG. 10 may be implemented outside of service allocation processor 1000 but communicatively coupled with service allocation processor 1000. In addition, some modules illustrated as outside of service allocation processor 1000 may be implemented within service allocation processor 1000.

In one embodiment, service selector 1014 is configured to order a group of one or more services to be placed in the network from the most utilized service to the least utilized service. Then the most utilized service of the group is selected to be placed in the network. The service placing logic 910 is configured to select a network device for the service so that placing the service to the network adds the least sum of additional delay based on services already based in the network. After the service is placed to be associated with the network device, path planner 1012 is configured to update a path for each subscriber utilizing the service to include the service, where the path is an ordered chain of services included in the subset of the set of services the subscriber utilizing. The path planner is configured to insert the service resulting in a minimum addition to delay to the subscriber. After the service is inserted in the chain of service, the service is removed from the group of services to be placed. The process continues for other services to be placed within service allocation processor 1000.

The operations of the flow diagrams in FIG. 9 are described with reference to the exemplary embodiment of FIG. 10. However, it should be understood that the operations of flow diagrams can be performed by embodiments of the invention other than those discussed with reference to FIG. 10, and the embodiments discussed with reference to FIG. 10 can perform operations different than those discussed with reference to the flow diagrams of FIG. 9.

While the flow diagrams in the figures herein above show a particular order of operations performed by certain embodiments of the invention, it should be understood that such order is exemplary (e.g., alternative embodiments may perform the operations in a different order, combine certain operations, overlap certain operations, etc.).

While the invention has been described in terms of several embodiments, those skilled in the art will recognize that the invention is not limited to the embodiments described, can be practiced with modification and alteration within the spirit and scope of the appended claims. The description is thus to be regarded as illustrative instead of limiting.

What is claimed is:

1. A method implemented at a network device of a network, wherein the network contains a plurality of network devices, wherein the network offers a set of services to subscribers, wherein each subscriber of the network utilizes a subset of the set of services, wherein the subset of the set of services is included in a chain of services for each subscriber, wherein an order of entries within the chain of services is determined by the network device, wherein traversing the plurality of network devices causes delay to the subscribers, and wherein the method associates a service with one of the plurality of network devices of the network when a group of one or more services have not been placed, the method comprising:

ordering the group of one or more services from one utilized by the largest number of subscribers to one utilized by the least number of subscribers;

selecting services from the one utilized by the largest number of subscriber to the one utilized by the least number of subscribers; and for each service, selecting one network device of the network for the service, the selecting includes calculating sums of additional delays if the service is to be placed at different network devices of the network and identifying the one network device resulting in a least sum of additional delay; and updating a path for each subscriber utilizing the service to include the service, wherein the path is an ordered chain of services included in the subset of the set of services the subscriber utilizing, and wherein the updating includes calculating additional delays if the service is inserted at different positions within the ordered chain of services and identifying a position for the service in the path resulting in a minimum addition to the delay to the subscriber.

2. The method of claim 1, wherein information about delay to the subscribers is based on at least one of a historical data of the subscribers of network during a time period and link delay information provided.

3. The method of claim 1, wherein each chain of services including an ingress at the beginning of the chain and an egress at the end of the chain, and wherein each of the ingress and egress is one network device of the network.

4. The method of claim 1, wherein each sum of additional delay based on services already place in the network is a sum of additional delay caused by placing the service at one network device for all existing paths including the service.

5. The method of claim 1, wherein the delay caused to subscribers is weighted differently at different links of the network.

6. The method of claim 1, wherein services are weighted differently when calculating the sum of additional delay.

7. The method of claim 1, wherein the group of unplaced services includes all services provided by the network.

8. The method of claim 1, wherein the network is a software-defined networking (SDN) system and the method is performed by a controller of the SDN system.

9. A network device coupled to a network, wherein the network contains a plurality of network devices, wherein the network offers a set of services to subscribers, wherein each subscriber of the network utilizes a subset of the set of services, wherein the subset of the set of services is included in a chain of services for each subscriber, wherein an order of entries within the chain of services is to be determined by the network device, wherein traversing the plurality of network devices causes delay to the subscribers, and wherein the network device associates a service with one of the plurality of the network device when a group of one or more services have not been place, the network device comprising:
  a service allocation processor for allocating services to the plurality of network devices, the service allocation processor including:
    a service selector configured to order the group of one or more services from one utilized by the largest number of subscribers to one utilized by the least number of subscribers, and
      the service selector further configured to select services from the one utilized by the largest number subscribers to the one utilized by the least number of subscribers;
    for each service,
    a service placing logic configured to select one network device of the network for the service, the selection includes a calculation of sums of additional delays if the service is to be placed at different network devices of the network and identification of the one network device resulting in a least sum of additional delay; and
    a path planner configured to update a path for each subscriber utilizing the service to include the service, wherein the path is an ordered chain of services included in the subset of the set of services the subscriber utilizing, and wherein the update includes a calculation of additional delays if the service is inserted at different positions within the ordered chain of services and identification of a position for the service in the path resulting in a minimum addition to the delay to the subscriber.

10. The network device of claim 9, further comprising a traffic flow interface configured to collect information about the delay to the subscribers and the subset of the set of services utilized by the subscribers during a time period.

11. The network device of claim 9, wherein each chain of services including an ingress at the beginning of the chain and an egress at the end of the chain, and wherein each of the ingress and egress is one network device of the network.

12. The network device of claim 9, wherein each sum of additional delay based on services already place in the network is a sum of additional delay caused by placing the service at one network device for all existing paths including the service.

13. The network device of claim 9, wherein the delay caused to the subscriber is weighted differently at different links of the network.

14. The network device of claim 9, wherein services are weighted differently when calculating the sum of additional delay.

15. The network device of claim 9, wherein the group of unplaced services includes all services provided by the network.

16. The network device of claim 9, wherein the network is a software-defined networking (SDN) system and the method is performed by a controller of the SDN system.

17. A non-transitory machine-readable storage medium having instructions stored therein, which when executed by a processor, causes the processor to perform operations implemented at a network device of a network, wherein the network contains a plurality of network devices, wherein the network offers a set of services to subscribers, wherein each subscriber of the network utilizes a subset of the set of services, wherein the subset of the set of services is included in a chain of services for each subscriber, wherein an order of entries within the chain of services is determined by the network device, wherein traversing the plurality of network devices causes delay to the subscribers, and wherein the operations associate a service with one of the plurality of network devices of the network when a group of one or more services have not been placed, the operations comprising:
  ordering the group of one or more services from one utilized by the largest number of subscribers to one utilized by the least number of subscribers;
  selecting services from the one utilized by the largest number of subscribers to the one utilized by the least number of subscribers; and
  for each service,
    selecting one network device of the network for the service, the selecting includes calculating sums of additional delays if the service is to be placed at different network devices of the network and identifying the one network device resulting in a least sum of additional delay; and
    updating a path for each subscriber utilizing the service to include the service, wherein the path is an ordered chain of services included in the subset of the set of services the subscriber utilizing, and wherein the updating includes calculating additional delays if the service is inserted at different positions within the ordered chain of services and identifying a position for the service in the path resulting in a minimum addition to the delay to the subscriber.

18. The non-transitory machine-readable storage medium of claim 17, wherein information about delay to the subscribers is based on at least one of a historical data of the subscribers of networking during a time period and link delay information provided.

19. The non-transitory machine-readable storage medium of claim 17, wherein services are weighted differently when calculating the sum of additional delay.

20. The non-transitory machine-readable storage medium of claim 17, wherein the network is a software-defined networking (SDN) system and the operations are performed by a controller of the SDN system.

* * * * *